United States Patent [19]

Lazzari

[11] E Patent Number: Re. 33,383

[45] Reissued Date of Patent: Oct. 16, 1990

[54] PROCESS FOR PRODUCING A MAGNETIC READ WRITE HEAD AND HEAD OBTAINED BY THIS PROCESS

[75] Inventor: Jean-Pierre Lazzari, Corenc, France

[73] Assignee: Commissariat a l'Energie Atomique, Paris, France

[21] Appl. No.: 300,974

[22] Filed: Jan. 24, 1989

Related U.S. Patent Documents

Reissue of:

[64] Patent No.: 4,639,289
Issued: Jan. 27, 1987
Appl. No.: 696,517
Filed: Jan. 30, 1985

[30] Foreign Application Priority Data

Feb. 3, 1984 [FR] France ..... 84 01879

[51] Int. Cl.[5] ..... G11B 5/127; G11B 5/17; G11B 5/187; B44C 1/22

[52] U.S. Cl. ..... 156/643; 204/192.32; 360/122; 360/123; 360/125; 437/228

[58] Field of Search ..... 204/192.32; 156/643, 156/648, 657, 662; 360/122, 125, 123, 113; 357/27, 55; 427/127-131; 437/64, 228, 52, 61, 245

[56] References Cited

U.S. PATENT DOCUMENTS 4,025,411 5/1977 Hom-Ma et al. ..... 156/643 X
4,256,514 3/1981 Pogge ..... 156/643 X

FOREIGN PATENT DOCUMENTS 56-83823 7/1981 Japan .

OTHER PUBLICATIONS

Fouchier, J., et al., Chemical Dictionary-Dictionaire de Chimie-Fachwörterbuch für Chemie, 2nd ed., NUP Amsterdam, 1961, p. 142.
IBM Technical Disclosure Bulletin, vol. 15, No. 2, Jul. 1972, pp. 516-517, Watrous, R. B., "Horizontal Thin-Film Head with Symmetrical Windings".
IBM Technical Disclosure Bulletin, vol. 21, No. 12, May 1979, p. 5002, Petersen, K. E., "Thin Film Magnetic Heads".
Patent Abstracts of Japan, vol. 4, No. 18 (E-171); Feb. 13, 1980, p. 35E171; and JP A 54-157,613 (Fujitsu K.K.), 12-12-79.
Patent Abstracts of Japan, vol. 4, No. 156 (P-34)[638], Oct. 31, 1980, p. 17P31; and JP A 55-105,817 (Fujitsu K.K.) 08-13-1980.
Patent Abstracts of Japan, vol. 5, No. 1 (P-43)[673], Jan. 8, 1981; and JP A 55-132,159 (Fijitsu K.K.) 10-1-5-1980.
Patent Abstracts of Japan, vol. 5, No. 5 (P-44)[677], Jan. 14, 1981; and JP A 55-135,321 (Fijitsu K.K.), 10-2-2-1980.
Patent Abstracts of Japan, vol. 5, No. 138 (P-78)[810], Sep. 2, 1981; and JP A 56-74812 (Nippon Denshin Denwa Kosha).
Patent Abstracts of Japan, vol. 6, No. 183 (P-143[1061], Sep. 18, 1982; and JP A 57-98,118 (Fujitsu K.K.) 06-1-8-1982.
Soviet Inventions Illustrated, Section EL, semaine CO6, Mar. 19, 1980; and SU A 662-961.
Patent Abstracts of Japan, vol. 5, No. 150 (P-81)[822], Sep. 22, 1981; and JP A 56-83823 (Fujitsu K.K.) 07-0-8-1981.

*Primary Examiner*—Raymond Hoch
*Attorney, Agent, or Firm*—Oblon, Spivak, McClelland, Maier & Neustadt

[57] ABSTRACT

A first magnetic material film is deposited on a support, a groove is etched in the first magnetic film which is shaped like a figure eight, a double coil is formed and is wound respectively around the two central pole pieces. An insulating material layer is deposited and etched in step form, the step having a side facing the central channel. An [magnetic] *amagnetic* film is deposited on the thus etched step, and the film is etched so as to only leave a wall perpendicular to the plane of the films. This is followed by the deposition of a magnetic film and then a protective layer, the assembly being divided off so as to expose two pole pieces separated by an [air gap] *amagnetic gap.*

4 Claims, 3 Drawing Sheets

PROCESS FOR PRODUCING A MAGNETIC READ WRITE HEAD AND HEAD OBTAINED BY THIS PROCESS

Matter enclosed in heavy brackets [ ] appears in the original patent but forms no part of this reissue specification; matter printed in italics indicates the additions made by reissue.

BACKGROUND OF THE INVENTION

The present invention relates to a process for producing a magnetic read and write head and to a head obtained by this process. It is used in magnetic recording equipment and in particular in computer memories.

The magnetic head according to the invention is of the type comprising two pole pieces, a double flat spiral coil surrounding each of the pole pieces and an air gap filled with an amagnetic material, the latter being flush with the level of the planar surface forming what is called the flight or displacement plane of the head. The magnetic recording support moves relative to the head in front of the air gap and parallel to the displacement plane. During writing, a current flowing in the winding leads to a magnetic field at the air gap, so that information is written into the support. Conversely, magnetic information written on to the moving support induces a field in the pole pieces, i.e. a current in the coil and a voltage at the terminals thereof, which constitutes a measuring signal. As the magnetic field involved in these reading and writing operations is parallel to the recording support, the term horizontal magnetic recording is sometimes used.

For example, such a head is described in Japanese Pat. No. 56 83823 filed by FIJITSU K.K. and entitled "Production of horizontal thin film magnetic head", whose abstract was published in Patent Abstracts of Japan, vol. 5, no. 150 (P-81) (822) of 22.9.1981.

The process for producing such a head comprises the end to end bonding of two thin magnetic pieces on a substrate, said magnetic pieces being separated by a nonmagnetic layer defining the air gap. This assembly is then machined to reduce the height of the air gap. Separately a support is formed comprising a double winding surrounding the two pole pieces. These two subassemblies are then bonded together.

Such a process suffers from numerous disadvantages. Firstly, it requires sensitive fitting of small parts, which makes it relatively incompatible with industrial, automated processes. The read and write pole pieces have on the one hand a significant width, which is prejudicial to the efficiency of the head, and on the other hand is of a relatively non-reproducible nature, which leads to performance variations. Finally, it can induce interference fields in the recording layer.

SUMMARY OF THE INVENTION

The present invention relates to a process for producing a magnetic head obviating the aforementioned disadvantages. As operations based on thin film technology are used, the process is suitable for automation. The width of the read and write pole pieces defined by the thickness of a thin film, so that said thickness is limited and perfectly reproducible. Moreover, the conductor winding is inserted between two magnetic films and is consequently completely shielded.

The present invention more specifically relates to a process for producing a magnetic read-write head, wherein it comprises the operations of depositing a first magnetic material film on a support, etching a groove in said first magnetic film, said groove being shaped like a figure of eight with two loops having in common a rectilinear central portion, the magnetic film being preserved within said two loops and forms there two central pole pieces separated by a central channel corresponding to the central part of the figure of eight, filling the groove with an electrically insulating material, etching in the insulating material a notch forming a double groove wound respectively around the two central pole pieces, depositing a conductive coating at the bottom of the double groove and filling the double groove with an electrically insulating material, depositing an insulating material layer, etching in said layer a step having a side facing the central channel, but which is slightly offcentred with respect thereto, depositing an amagnetic material film on the thus etched step, etching said amagnetic film so as to only leave a wall perpendicular to the plane of the films and constituted by that part of the amagnetic film deposited on the side of the step depositing a second magnetic material film forming a boss covering the wall, depositing a protective coating exactly following the shape of the boss and cutting the protective coating of the boss and the amagnetic wall, so that two pole pieces separated by an [air] *amagnetic* gap appear.

The present invention also relates to a magnetic head obtained by the process defined hereinbefore. The head is characterized by the presence of two magnetic coatings, which completely secure between them the spiral coil and in that the read and write pole pieces are constituted by sections of a thin magnetic film.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
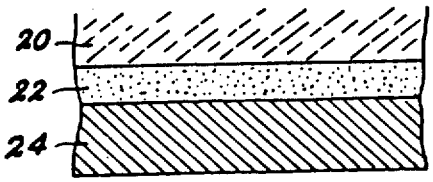
FIGS. 1 to 8 various stages of the process according to the invention.

In FIG. 1 support 20 can be made from a ceramic material, a dielectric material, or in the form of a silicon wafer similar to that used in semiconductor technology. In this case, the wafer is coated with a silica coating 22 formed by thermal oxidation. A film 24 is then deposited from a high permeability, strong magnetization magnetic material, such as a ferrite, or an alloy of FeNi or Co, Zr, Nb. The thickness of the magnetic coating is between 0.5 and 5 $\mu$m.

Figure 2:
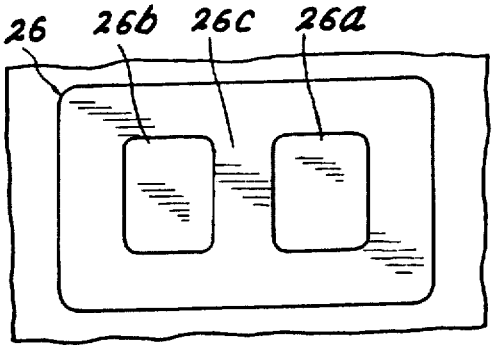
Figure 3:
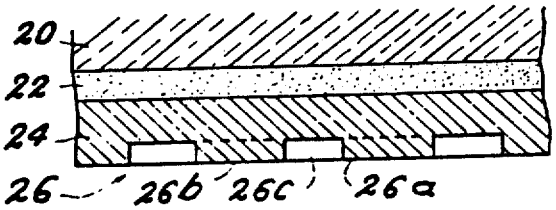

FIGS. 2 and 3 show a groove 26 in the form of a figure of eight etched in the film 24. The etching of the groove leaves behind two central pole pieces 26a, 26b separated by a central rectilinear channel 26c. Groove 26 is obtained with the aid of a resin mask produced by photolithography and etched either chemically, or by dry etching.

The etching depth of groove 26 corresponds to a fraction of the thickness of film 24 (a third or a half).

Figure 4:
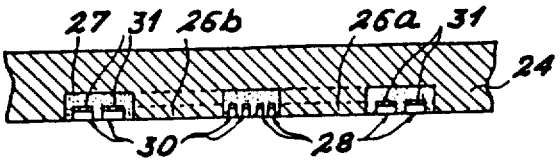
Figure 5:
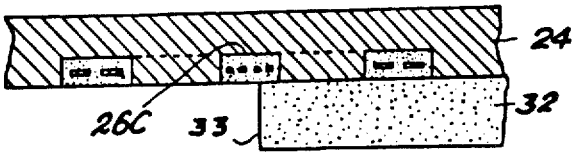
Figure 6:
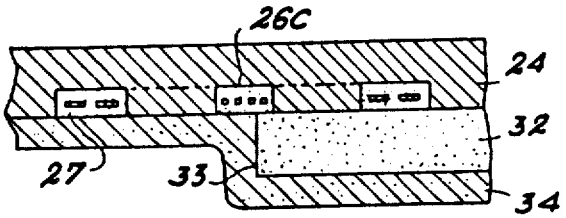

FIG. 4 shows the filling of groove 26 with a dielectric material 27, such as silica or resin. A well known planarization operation ensures that the dielectric is only located in the groove and not on the surface of film 24.

A double spiral groove 28 and 30 is then formed in the filling dielectric 27 (FIG. 4). This is followed by the deposition of an electrically conductive material layer 31 at the bottom of the double groove. This material can be copper or aluminium. This is followed by the formation of a coil, whose plane is parallel to the recording layer. The coil comprises a half 28 surrounding the pole piece 26a and a half 30 surrounding the pole piece 26b.

Figure 9:
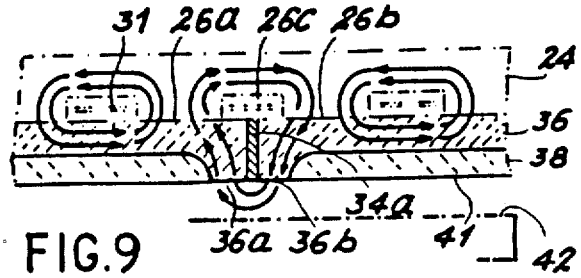
FIG. 9 in section, the head according to the invention.

The exploded view of FIG. 9 more clearly shows the configuration of this coil. It can more particularly be seen that the width of the conductor in the central part of the coil is smaller than in the two lateral parts, so that there is a high current density in the first part, which contributes to a greater efficiency of the head. The two grooves 28 and 30 are then filled with an insulating material identical or similar to material 27.

Figure 7:
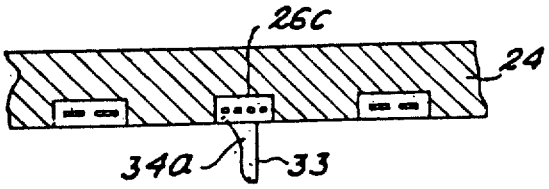

A dielectric layer 32 is then deposited on the assembly and is preferably constituted by a photosensitive resin. Its thickness is between 0.5 μm and a few microns. A step is formed by photolithography and its side 33 is displaced with respect to the central channel 26c separating poles 26a and 26b. This displacement is approximately equal to half the thickness of the amagnetic film 34, which is then deposited. This amagnetic film is advantageously of silica or alumina and covers the resin step, as shown in FIG. 7.

By anisotropic reactive ionic etching and following dissolving of the resin, a vertical wall 34a is left, whose thickness is equal to or slightly less than that of the amagnetic film 34 and whose height is equal to or less than the thickness of the resin layer 32.

Figure 8:
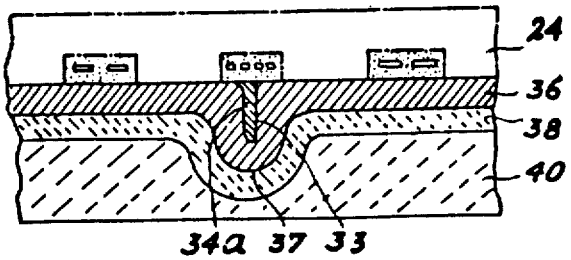

This is followed by the deposition of a magnetic film 36, which can be of the same nature as film 24. Film 36 forms a boss at wall 34a, as can be seen in FIG. 8. This is followed by the deposition on the assembly of a hard insulating protective coating 38, which can be of silica or alumina and exactly follows the shape of boss 37.

Finally, a resin layer 40 is deposited and will provisionally serve to divide off the bosses and wall 34a, dividing off taking place in coating 38.

The top of wall 34a is then exposed forming an [air] *amagnetic* gap between the two pole pieces 36a, 36b. The magnetic film 36 has a thickness between 0.2 and 1.5 μm, i.e. it is very thin. The same applies with regards to pole pieces 36a, 36b, whose width is of the same order of magnitude as said thickness. This leads to the high efficiency of the magnetic head according to the invention.

FIG. 9 shows the head which is finally obtained. The arrows representing the flux or flow lines on writing in a magnetic support 42 moving in front of the flight or displacement plane 41 constituted by what is left of the coating 38.

It is pointed out that the two lateral portions of the coil are magnetically shielded by the two films 24 and 36, so that they produce no leakage field towards the recording coating 42.

Figure 10:
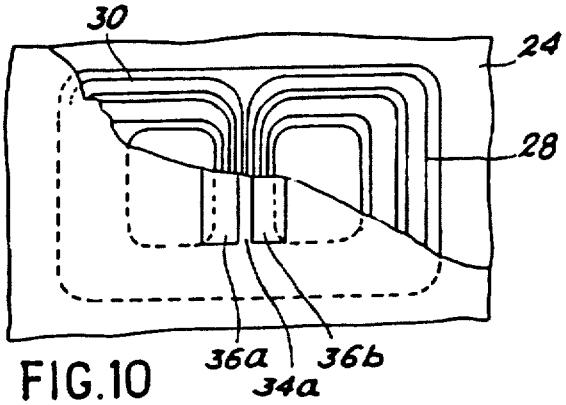
FIG. 10 an exploded view of the head according to the invention.

Finally, FIG. 10 shows an exploded view of the head observed in front of its flight or displacement plane. Only the ends of the two read and write pole pieces 36a, 36b separated by wall 34a are flush with the level of the flight plane.

What is claimed is:

1. A process for producing a magnetic read-write head, comprising the steps of: depositing a first magnetic material film on a support, etching a groove in said first magnetic film, said groove being shaped like a figure eight with two loops having in common a rectilinear central portion, the magnetic film being preserved within said two loops and forms there two central pole pieces separated by a central channel corresponding to the central portion of the figure eight, filling the groove with an electrically insulating material, etching in the insulating material a notch forming a double groove wound respectively around the two central pole pieces, depositing a conductive coating at the bottom of the double groove and then filling the double groove with a first electrically insulating material, depositing a second insulating material layer on the two central pole pieces and on the first electrically insulating material, etching in said layer a step having a side substantially perpendicular to the surface of the central portion of the figure eight but which is slightly off-center with respect thereto, depositing an amagnetic material film on the thus etched step, anisotropic etching said amagnetic film so as to only leave a wall of said amagnetic film perpendicular to the plane of the films and constituted by that part of the amagnetic film depositing on the side of the step, depositing a second magnetic material film forming a boss covering the wall, depositing a protective coating on said second magnetic material film and covering the boss and cutting the protective coating of the second magnetic material film and the amagnetic wall, along a common horizontal plane substantially parallel to said first magnetic film, pole pieces are separated by an [air] *amagnetic* gap.

2. A process according to claim 1, wherein the support on which is deposited the first magnetic material film comprises an insulating support covered with a dielectric material coating.

3. A process according to claim 1, wherein the thickness of the second magnetic material film is between 0.2 and 1.5 μm.

4. A process according to claim 1, wherein the second insulating material is a photosensitive resin, which can be removed by dissolving.

* * * * *